(12) United States Patent
Yelverton

(10) Patent No.: US 6,189,905 B1
(45) Date of Patent: Feb. 20, 2001

(54) SHOCK ABSORBING BICYCLE WITH PRESSURIZED AIR SUPPLY SYSTEM

(75) Inventor: Forrest Yelverton, Lyons, CO (US)

(73) Assignee: GT Bicycles, Inc., Santa Ana, CA (US)

( * ) Notice: Under 35 U.S.C. 154(b), the term of this patent shall be extended for 0 days.

(21) Appl. No.: 09/226,294

(22) Filed: Jan. 7, 1999

(51) Int. Cl.[7] ............... B62J 11/02; F16H 7/22; F16H 59/04
(52) U.S. Cl. ............ 280/201; 280/260; 280/276; 474/81; 474/110
(58) Field of Search ................... 280/201, 236, 280/260, 261, 276, 212, 216; 74/502 R; 474/70, 80, 81, 78, 110

(56) References Cited

U.S. PATENT DOCUMENTS

| Re. 30,758 | * | 10/1981 | Lang | 474/80 |
| 3,742,777 | * | 7/1973 | Mathauser | 74/242.3 |
| 5,553,510 | * | 9/1996 | Ballhorn | 74/354 |
| 5,605,514 | * | 2/1997 | Driver | 474/70 |
| 5,890,979 | * | 4/1999 | Wendler | 474/82 |

FOREIGN PATENT DOCUMENTS

| 3540931 | * | 5/1987 | (DE) | 280/201 |
| 566285 | * | 2/1924 | (FR) | 280/201 |
| 2855 | * | of 1893 | (GB) | 280/201 |

* cited by examiner

*Primary Examiner*—Anne Marie Boehler
(74) *Attorney, Agent, or Firm*—Stetina Brunda Garred & Brucker

(57) ABSTRACT

A pressurized air supply system for providing pressurized air to an air powered derailleur of a bicycle having a bicycle frame. The system comprises an air pumping mechanism attached to the bicycle frame and adapted to supply pressurized air when actuated. Fluidly connected to the pumping mechanism and to the derailleur is a pressure reservoir of the system. The pumping mechanism is attached to the bicycle frame such that the passage of the bicycle over uneven terrain facilitates the actuation of the pumping mechanism and resultant charging of the pressure reservoir with pressurized air.

23 Claims, 2 Drawing Sheets

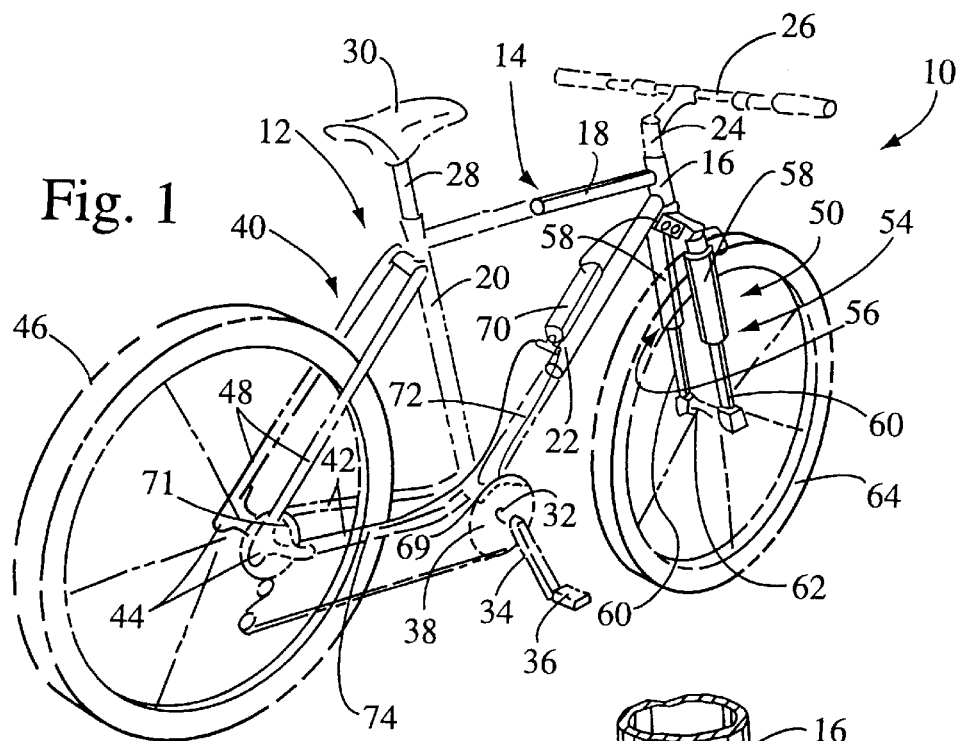
Fig. 1
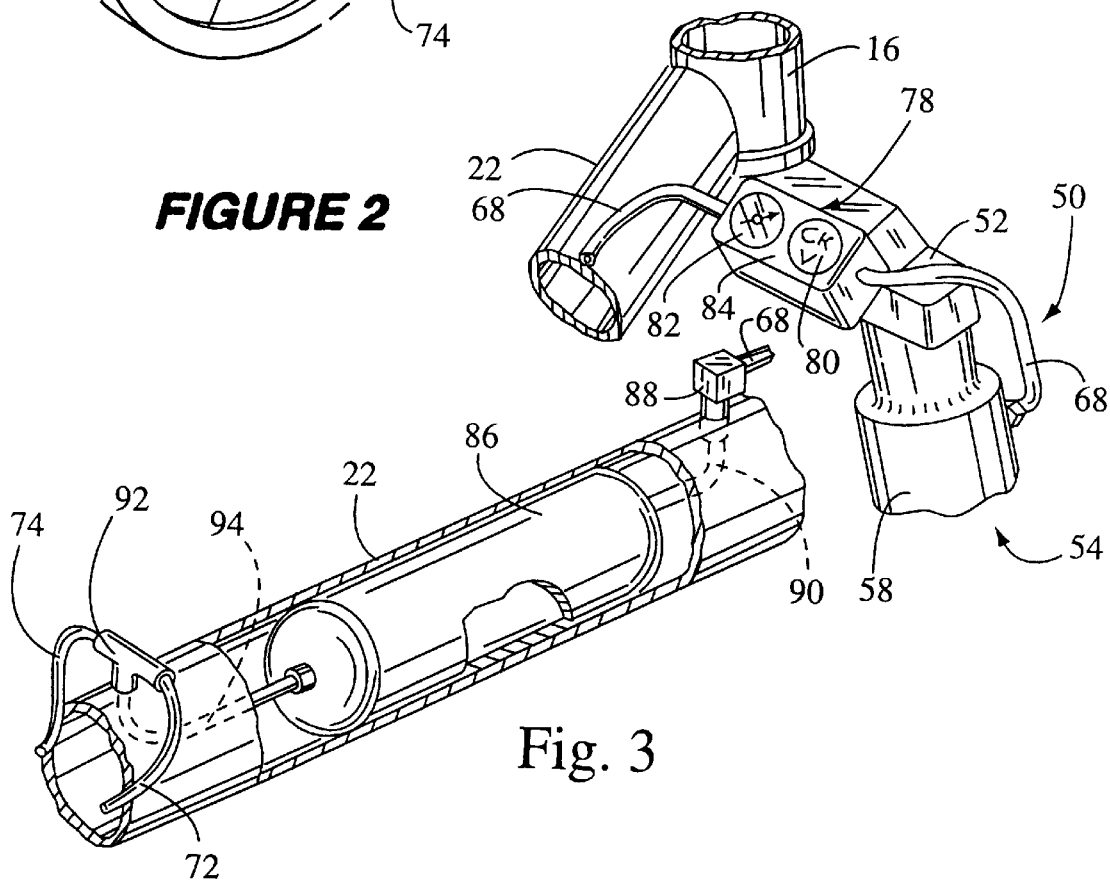
FIGURE 2
Fig. 3

SHOCK ABSORBING BICYCLE WITH PRESSURIZED AIR SUPPLY SYSTEM

FIELD OF THE INVENTION

The present invention relates generally to bicycles, and more particularly to a shock absorbing bicycle frame which is specifically adapted to provide a supply of pressurized air to a pressure reservoir which is itself used as a pressurized air source for an air actuated or powered shifting system.

BACKGROUND OF THE INVENTION

In the prior art, it is known to provide multi-speed bicycles with both front and rear derailleurs which are used to selectively move the drive chain of the bicycle between the sprockets of the front and rear sprocket clusters of the bicycle. These front and rear derailleurs are mechanically actuated via respective ones of a pair of cables which extend between the derailleurs and a pair of shifter handles which are typically located on the bicycle frame so as to be easily accessible by the rider.

There is also known in the prior art single and multi-speed bicycles which include a shock absorbing front fork alone or in combination with a shock absorbing rear assembly. Shock absorbing front forks as currently known in the prior art typically comprise a pair of fluid-damped or spring-damped legs or pistons, the distal ends of which are attached to respective ends of the axle of the front wheel. Shock absorbing rear assemblies known in the prior art are provided in numerous configurations, and typically include a shock absorber which is extended between pairs of components which define the "rear triangle" of the bicycle frame, e.g., the seat tube, swingarms, chain stays, etc.

In view of various shortcomings associated with the traditional front and rear derailleurs which are actuated through the use of cables, there has been developed a shifting system for use in multi-speed bicycles wherein the front and rear derailleurs are configured to be actuated through the use of pressurized air instead of cables. This new air powered shifting system, wherein air lines are fluidly connected to the front and rear derailleurs as an alternative to cables, allows for very quick and virtually friction free gear changes as compared to the use of cables in the traditional cable actuated shifting system. As will be recognized, the new air powered shifting system currently requires that the bicycle be provided with an onboard pressurized air canister. This canister is attached to the bicycle frame (typically the down tube), and is capable of providing approximately three thousand shifts of the front and rear derailleurs prior to having to be repressurized or recharged. The recharging process is typically facilitated by pressurizing the canister at a gas station with a standard air compressor and tire inflation fittings.

Though this new air powered shifting system provides advantages over the traditional cable actuated shifting system, it also possesses certain deficiencies which detract from its overall utility. More particularly, since the canister of such air powered shifting system can only accommodate a prescribed volume of pressurized air, it has the capability of providing only a fixed amount of shifts before requiring a recharge. Though, as indicated above, the canister of the current air powered shifting system provides the capacity for approximately three thousand shifts of the front and rear derailleurs, the exhausting of the pressurized air supply when the rider of the bicycle is at a location far removed from a gas station or other source of pressurized air effectively precludes the rider from being able to shift the gearing on the bicycle.

The present invention addresses this shortcoming in the air powered shifting system by providing a shock absorbing bicycle frame having the capability of continuously recharging a pressure reservoir which itself serves as a pressurized air source for an air powered front and/or rear derailleur shifting system. In the present invention, a modified version of an existing shock absorbing front fork is employed in the bicycle frame to provide both the shock absorbing qualities of a standard shock absorbing front fork as well as a source or supply of pressurized air for the air powered shifting system. In particular, one leg or piston of the front fork is used to provide the standard shock absorbing quality of a shock absorbing front fork, with the other leg or piston serving as a "pump" to supply pressurized air to a pressure reservoir which is in turn fluidly connected to the air powered shifting system. The constant up and down motion of the front fork during normal riding of the bicycle provides the mechanical pumping action needed for the pump leg or piston to charge or pressurize the pressure reservoir. An air line fluidly connected to the top of the pump leg runs either externally or internally to the pressure reservoir which may comprise an air storage container or canister carried on the bicycle frame or disposed therein as a separate component, or may be formed as an integral portion of the bicycle frame itself. The supply of pressurized air could also be provided by the shock absorber of the rear assembly as an alternative to outfitting the bicycle with the modified shock absorbing front fork.

SUMMARY OF THE INVENTION

In accordance with the present invention, there is provided a bicycle having an onboard, self charging pressurized air supply system which is used to operate an air powered front and/or rear derailleur of the bicycle. In a first embodiment of the present invention, the system comprises an air pumping mechanism which is attached to the bicycle frame of the bicycle, and is adapted to provide a source of pressurized air when actuated by the application of an external force thereto. In addition to the air pumping mechanism, the system comprises a pressure reservoir which is fluidly connected to both the pumping mechanism and the derailleur(s). The pumping mechanism is attached to the bicycle frame such that the passage of the bicycle over uneven terrain, including bumps or other minor obstructions, facilitates the actuation of the pumping mechanism and resultant charging of the pressurized reservoir with pressurized air emanating therefrom. The fluid connection of the pumping mechanism to the pressure reservoir is preferably facilitated via a fluid line or air hose which may be extended externally along the outer surface or exterior of the bicycle frame, or alternatively may be extended internally within the hollow interior thereof. Similarly, the fluid connection of the pressure reservoir to the front and/or rear derailleur(s) is preferably facilitated by a single air hose (in the case of one derailleur) or a pair of air hoses (in the case of two derailleurs) which may also may be extended externally along the outer surface or exterior of the bicycle frame, or alternatively may be extended internally within the hollow interior thereof.

Included with the bicycle is a shock absorbing front fork which is attached to the bicycle frame, and a front wheel having an axle which is rotatably connected to the front fork. The front fork includes a pair of legs which are attached to the axle of the front wheel. In the first embodiment of the present invention, one of the legs of the front fork functions as the pumping mechanism of the system, with the remaining leg functioning as a shock absorber for the front wheel.

More particularly, each of the legs of the front fork comprises a hollow cylinder having a piston slidably moveable within the interior thereof. Attached to the piston is one end of an elongate piston rod which extends axially from the bottom end of the cylinder. The distal end of the piston rod, i.e., the end opposite that attached to the piston, is rotatably connected to one end of the axle. The cylinder of the leg which functions as the pumping mechanism is fluidly connected to the pressure reservoir via the above-described air hose. The cylinder of the remaining leg of the front fork which functions as a shock absorber for the front wheel may be fluid filled so as to provide fluid dampening to the piston, or may alternatively have a dampening spring disposed therein.

The system constructed in accordance with the first embodiment of the present invention further preferably includes a valve assembly which is fluidly coupled between the pumping mechanism and the pressure reservoir, and more particularly within the air hose fluidly connecting the cylinder of the pumping leg of the front fork to the pressure reservoir. The valve assembly comprises a check valve which allows for the flow of air only from the pumping mechanism to the pressure reservoir, and a pressure gauge which is disposed downstream of the check valve (i.e., between the check valve and the pressure reservoir) for providing the rider of the bicycle with a visual indication of the pressure level within the pressure reservoir. In addition to the check valve and the pressure gauge, the valve assembly also preferably includes a pressure relief valve which is also downstream of the check valve and is used to vent the pressure reservoir in the event the pressure level therewithin exceeds a prescribed limit.

The bicycle frame of the bicycle including the pressurized air supply system of the present invention is preferably fabricated from multiple tubular members, including a head tube, a seat tube, a top tube, and a down tube. In the first embodiment of the present invention, the pressure reservoir comprises a storage canister which is attached to the bicycle frame, and more particularly to the exterior of the down tube thereof. In accordance with a second embodiment of the present invention, the pressure reservoir comprises a storage canister which is disposed within the bicycle frame, and more particularly within the hollow interior of the down tube. In accordance with a third embodiment of the present invention, the pressure reservoir comprises a hollow interior chamber formed within and defined by the bicycle frame, and more particularly the down tube thereof.

Further in accordance with the present invention, there is provided a method of supplying pressurized air to an air powered derailleur of a bicycle which includes a bicycle frame. The method comprises the initial steps of providing the bicycle with the above-described air pumping mechanism and pressure reservoir, which is followed by the step of actuating the pumping mechanism to facilitate the charging of the pressure reservoir with pressurized air. The actuation step is preferably accomplished by riding the bicycle over uneven terrain.

BRIEF DESCRIPTION OF THE DRAWINGS

These, as well as other features of the present invention, will become more apparent upon reference to the drawings wherein:

FIG. 1 is a rear perspective view of a shock absorbing bicycle including a pressurized air supply system constructed in accordance with a first embodiment of the present invention and having a pressurized air storage canister attached to the exterior of the bicycle frame;

FIG. 2 is a partial perspective view of the valving assembly disposed between the pump of the pressurized air supply system of the first embodiment and the storage canister thereof;

FIG. 3 is a partial cross-sectional view of a pressurized air supply system constructed in accordance with a second embodiment of the present invention and having a pressurized air storage canister disposed within the interior of the bicycle frame of the bicycle;

DETAILED DESCRIPTION OF THE PREFERRED EMBODIMENTS

Figure 4:
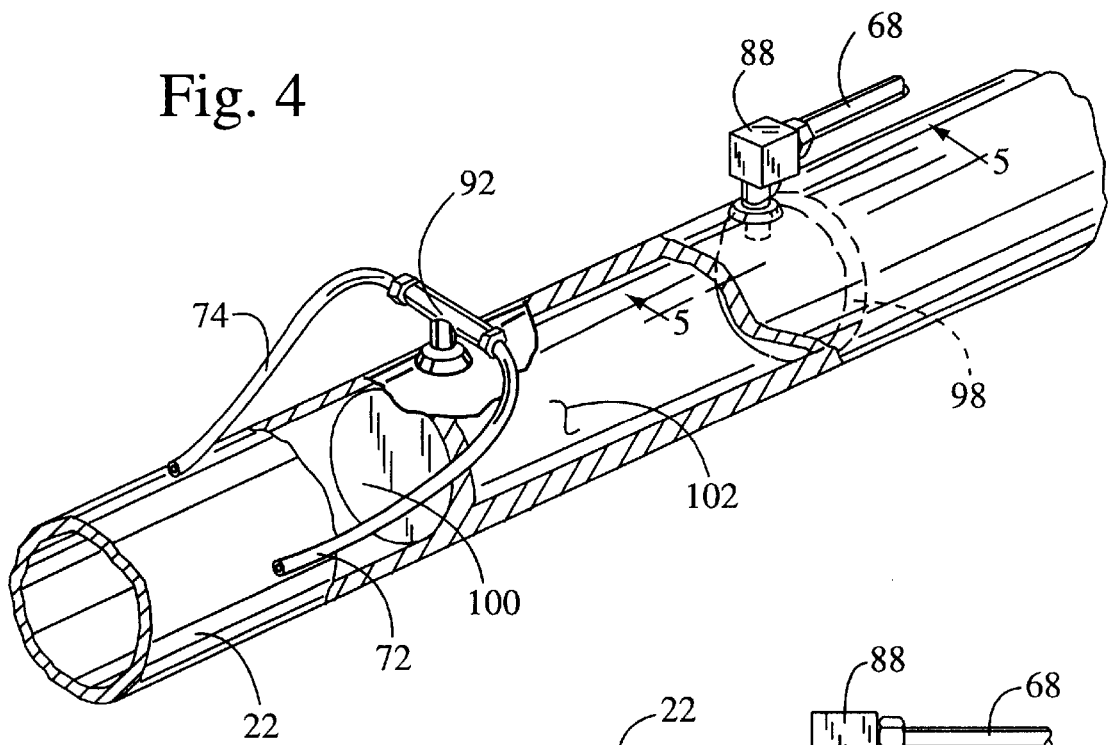
FIG. 4 is a partial cross-sectional view of a pressurized air supply system constructed in accordance with a third embodiment of the present invention and having a pressurized air storage reservoir which is formed as an integral portion of the bicycle frame of the bicycle.

Referring now to the drawings wherein the showings are for purposes of illustrating preferred embodiments of the present invention only, and not for purposes of limiting the same, FIG. 1 perspectively illustrates a shock absorbing bicycle 10 including a pressurized air supply system constructed in accordance with a first embodiment of the present invention. The bicycle 10 includes a bicycle frame 12 having a main frame 14 which defines a front triangle of the bicycle 10 and itself includes a head tube 16, an elongate top tube 18, an elongate seat tube 20, and an elongate down tube 22. The front end of the top tube 18 and the top end of the down tube 22 are attached to the head tube 16 which accommodates the stem 24 of the handle bars 26. Telescopically received into the top end of the seat tube 20 is a seat post 28 having a seat or saddle 30 attached to the top end thereof. Though not shown, the bottom ends of the seat and down tubes 20, 22 are typically attached to a bottom bracket axle sleeve which accommodates the crank axle 32 of the bicycle 10. Attached to the ends of the crank axle 32 are the elongate cranks 34 of the bicycle 10, the distal ends of which include pedals 36 rotatably connected thereto. The main chain wheel or sprocket 38 of the bicycle 10 is also attached to the crank axle 32.

In addition to the main frame 14, the bicycle frame 12 includes a rear assembly 40 which is connected to the main frame 14 and generally defines a rear triangle of the bicycle 10. The rear assembly 40 comprises a pair of elongate chain stays 42, the front ends of which are typically attached to the bottom bracket axle sleeve. Rigidly attached to respective ones of the back ends of the chain stays 42 is a pair of drop-outs 44 which rotatably accommodate the axle of the rear wheel 46. The rear assembly 40 further includes a pair of elongate seat stays or swingarms 48, the bottom ends of which are rigidly attached to respective ones of the drop-outs 44. The top ends of the swingarms 48 are themselves attached to the seat tube 20. In the bicycle frame 12, the head, top, seat and down tubes 16, 18, 20, 22 of the main frame 14 and the chain stays 42 and swingarms 48 of the rear assembly 40 each typically have hollow, tubular constructions. However, those of ordinary skill in the art will recognize that any of these components may be formed to have a solid construction.

The bicycle 10 shown in FIG. 1 is deemed to have a "hard tail" rather than a "soft tail" in that the rear assembly 40 thereof is non-pivoting. However, the bicycle 10 could be modified to impart shock absorbing capability to the rear assembly 40 by pivotally connecting the front ends of the chain stays 42 to the bottom bracket axle sleeve, pivotally connecting the top ends of the swingarms 48 to the seat tube 20, pivotally connecting the back ends of the chain stays 42 and/or the bottom ends of the swingarms 48 to respective ones of the drop-outs 44, and extending a shock absorber between at least two components of the bicycle frame 12. Numerous configurations may be employed to integrate a shock absorber into the bicycle frame 12 for purposes of imparting shock absorbing capability to the rear assembly 40.

Because the bicycle 10 shown in FIG. 1 is a "hard tail", its shock absorption capability is imparted by a front fork 50 thereof. As seen in FIGS. 1 and 2, the front fork 50 is rotatably connected to the head tube 16 of the main frame 14, and includes an elongate, horizontally oriented upper section 52. Attached to and extending downwardly from the upper section 52 adjacent respective ones of the opposed ends thereof are first and second legs 54, 56 of the front fork 50. The first and second legs 54, 56 have substantially similar configurations, and each include an elongate, hollow cylinder 58 having a piston (not shown) which is slidably moveable within the interior thereof. Attached to the piston is one end of an elongate piston rod 60 which extends axially from the bottom end of the cylinder 58. In the front fork 50, the distal ends of the piston rods 60 of the first and second legs 54, 56 (i.e., the ends opposite those attached to the pistons) are rotatably connected to respective ends of the axle 62 of the front wheel 64 of the bicycle 10. In the bicycle 10, the second leg 56 of the front fork 50 functions as a shock absorber for the front wheel 64. In this respect, the cylinder 58 of the second leg 56 may be fluid filled so as to provide fluid dampening to the piston, or may alternatively have a dampening spring disposed therein. The first leg 54 of the front fork functions as an air pumping mechanism for the pressurized air supply system constructed in accordance with the first embodiment of the present invention, as will be described in more detail below.

Referring now to FIGS. 1 and 2, the bicycle 10 is a multi-speed bicycle, and includes one or more front sprockets attached to the crank axle 32 adjacent the chain wheel 38, and a rear sprocket cluster which is attached to the axle of the rear wheel 46. To facilitate the selective movement or transfer of the drive chain 66 of the bicycle 10 between the chain wheel 38 and the front sprocket(s), attached to the main frame 14 adjacent the bottom bracket axle sleeve is a front derailleur 69. Similarly, to facilitate the selective movement or transfer of the chain 66 between any of the sprockets of the rear sprocket cluster of the bicycle 10, attached to the rear assembly 40 of the bicycle frame 12 is a rear derailleur 71. However, those of ordinary skill in the art will recognize that the bicycle 10 may be configured so as to be provided with only the front derailleur 69 (in the absence of a rear sprocket cluster) or only the rear derailleur 71 (in the absence of any front sprocket(s)). The front and rear derailleurs 69, 71 of the bicycle 10 are each air powered, and thus actuated via pressurized air rather than through the use of traditional actuation cables.

The pressurized air supply system constructed in accordance with the first embodiment of the present invention is used to provide a supply of pressurized air to the air powered front and rear derailleurs 69, 71 of the bicycle 10. As indicated above, such system comprises the first leg 54 of the front fork 50 which functions as a pressurized air pumping mechanism thereof. In this respect, the passage or travel of the front wheel 64 of the bicycle 10 over uneven terrain, including bumps or small obstructions, results in the piston rod 60 of the first leg 54 being forced upwardly into the interior of the cylinder 58, which in turn results in the movement of the piston toward the upper section 52 of the front fork 50. Such movement of the piston results in pressurized air being forced from within the cylinder 58 of the first leg 54 into an air hose 68 of the pressurized air supply system, one end of which is fluidly connected to the cylinder 58 in close proximity to the top end thereof.

In the pressurized air supply system of the first embodiment, the end of the air hose 68 opposite that fluidly connected to the cylinder 58 of the first leg 54 is fluidly connected to a pressure reservoir of the system which preferably comprises a storage canister 70. The storage canister 70 is itself preferably attached to the exterior of the main frame 14, and more particularly to the down tube 22 thereof as shown in FIG. 1. The air hose 68 extends along the exterior of the bicycle frame 12, and in particular the main frame 14 thereof. The storage canister 70 is fluidly connected to the air powered front and rear derailleurs 69, 71 of the bicycle 10 via respective ones of a pair of air hoses 72, 74. In this respect, fluidly connected to the storage canister 70 is one end of a generally T-shaped fitting 76. The remaining two ends of the fitting 76 are fluidly connected to respective ones of the air hoses 72, 74. Like the air hose 68, the air hoses 72, 74 extend along the exterior of the bicycle frame 12. As will be recognized, the combination of the fitting 76 and air hoses 72, 74 allows for the flow of pressurized air from within the storage canister 70 to respective ones of the front and rear derailleurs 69, 71 of the bicycle 10.

The pressurized air supply system of the first embodiment further preferably includes a valve assembly 78 which is fluidly coupled within the air hose 68, and thus is fluidly coupled between the first leg 54 of the front fork 50 (i.e., the pressurized air pumping mechanism) and the storage canister 70. The valve assembly 78 comprises a check valve 80 which allows for the flow of air only from the first leg 54 of the front fork 50 to the storage canister 70. In addition to the check valve 80, the valve assembly 78 includes a pressure gauge 82 which is disposed downstream of the check valve 80 (i.e., between the check valve 80 and the storage canister 70) for providing the rider of the bicycle 10 with a visual indication of the pressure level within the storage canister 70. The valve assembly 78 also preferably includes a pressure relief valve 84 which is also downstream of the check valve 80 and is used to vent the storage canister 70 in the event the pressure level therewithin exceeds a prescribed limit. The valve assembly 78 is preferably attached to the upper section 52 of the front fork 50, though those of ordinary skill in the art will recognize that the same may be attached to virtually any location upon the bicycle frame 12 or handle bars 26.

During the riding of the bicycle 10 over uneven terrain, the actuation of the first leg 54 of the front fork 50 in the above-described manner effectively results in the charging or pressurization of the storage canister 70. The storage canister 70 itself provides a source of pressurized air as is needed for the actuation or operation of the air powered front and rear derailleurs 69, 71 of the bicycle 10. Advantageously, the process of charging the storage canister 70 is virtually continuous as the front wheel 64 of the bicycle 10 passes over bumps or small obstructions. As the first leg 54 of the front fork 50 is providing a supply of pressurized air to the storage canister 70, the second leg 56 of the front fork 50 is providing conventional shock absorption to the front wheel 64.

The inclusion of the pressure relief valve 84 in the valve assembly 78 prevents overpressurization of the storage canister 70 which could otherwise result in the lock-up or "freezing" of the first leg 54, thus preventing the actuation of the shock absorbing second leg 56. It will be recognized that as an alternative to extending along the exterior of the bicycle frame 12, the air hose 68 (other than for the valve assembly 78 fluidly coupled therein) and the air hoses 72, 74 may extend within the hollow interiors of the various tubular components from which the main frame 14 and rear assembly 40 of the bicycle frame 12 are fabricated. More particularly, the air hose 68 may be extended within the head and down tubes 16, 22 of the main frame 14, with the air hose 72 being extended within the down tube 22, and the air hose 74 being extended within the down tube 22 and one of the chain stays 42.

Referring now to FIG. 3, there is depicted a pressurized air supply system which is constructed in accordance with a second embodiment of the present invention for use in supplying pressurized air to the air powered front and rear derailleurs 69, 71 of the bicycle 10. The system of the second embodiment is identical to that of the first embodiment except that the pressure reservoir thereof comprises a storage canister 86 which is disposed within the hollow interior of the down tube 22 of the main frame 14 rather than being attached to the exterior thereof. The fluid connection of the air hose 68 of the system of the second embodiment to the storage canister 86 is facilitated by a first fitting 88 which is attached to the down tube 22, and is itself fluidly connected to one end of the storage canister 86 via a fluid line 90 which extends within the interior of the down tube 22. The air hoses 72, 74 of the system of the second embodiment are fluidly coupled to the storage canister 86 via a generally T-shaped second fitting 92 which is similar to the previously described fitting 76, and includes one end which is attached to the down tube 22. That end of the second fitting 92 attached to the down tube 22 is fluidly connected to the storage canister 86 via a fluid line 94 which, like the fluid line 90, also extends within the interior of the down tube 22. The air hoses 72, 74 of the system of the second embodiment are fluidly connected to respective ones of the remaining two ends of the second fitting 92. Those of ordinary skill in the art will recognize that the storage canister 86 included in the pressurized air supply system of the second embodiment may be disposed within other hollow components of the main frame 14 other than for the down tube 22 (e.g., the top tube 18 or seat tube 20).

Figure 5:
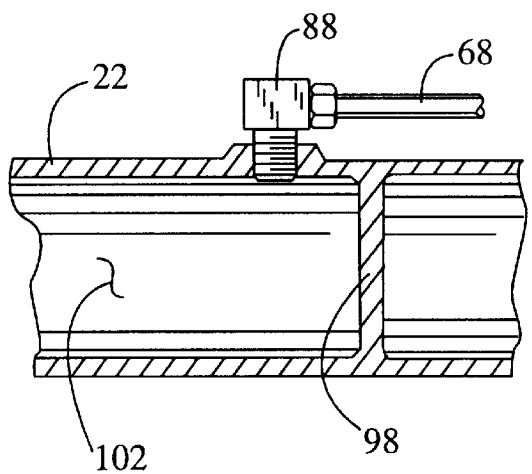
FIG. 5 is a cross-sectional view taken along line 5—5 of FIG. 4.

Referring now to FIGS. 4 and 5, there is depicted a pressurized air supply system constructed in accordance with a third embodiment of the present invention. The system of the third embodiment is similar to that of the second embodiment except that the pressure reservoir for the storage of pressurized air in the third embodiment is formed within and defined by the down tube 22 itself, rather than by a separate component disposed within the down tube 22 (i.e., the storage canister 86). More particularly, in the third embodiment, the down tube 22 of the main frame 14 is formed to include an integral first interior wall 98 and an integral second interior wall 100. The down tube 22 and first and second interior walls 98, 100 thereof collectively define a hollow interior chamber 102 which functions as the pressure reservoir in the third embodiment. The first fitting 88 in the third embodiment is fluidly connected to the interior chamber 102 via the attachment thereof directly to the down tube 22 at a location between the first and second interior walls 98, 100. Additionally, in the third embodiment, the second fitting 92 is fluidly connected to the interior chamber 102 via the attachment thereof directly to the down tube 22 at a location between the first and second interior walls 98, 100. Those of ordinary skill in the art will recognize that the air hoses 68, 72, 74 in the pressurized air supply systems of the second and third embodiments may also extend within the bicycle frame 12 rather than along the exterior thereof.

Additional modifications and improvements of the present invention may also be apparent to those of ordinary skill in the art. For example, if the rear assembly 40 of the bicycle frame 12 is provided with shock absorbing capability via the integration of a shock absorber therein, such shock absorber could serve as the air pumping mechanism to supply pressurized air to the pressure reservoir of any of the above-described embodiments of the present invention. In such a configuration, the front fork 50 of the bicycle 10 could be provided in a standard configuration wherein the first leg 54 thereof provides shock absorption in the same manner as the second leg 56. Thus, the particular combination of parts described and illustrated herein is intended to represent only certain embodiments of the present invention, and is not intended to serve as limitations of alternative devices within the spirit and scope of the invention.

What is claimed is:

1. In a bicycle having a bicycle frame including a rear assembly, a front fork attached to the bicycle frame, and an air powered derailleur, the improvement comprising a self charging pressurized air supply system for the derailleur, the system comprising:
   an air pumping mechanism attached to at least one of the front fork and the rear assembly of the bicycle frame and adapted to provide a source of pressurized air when actuated; and a pressure reservoir fluidly connected to the pumping mechanism and to the derailleur;
   the pumping mechanism being attached to the bicycle frame such that passage of the bicycle over uneven terrain facilitates the actuation of the pumping mechanism and resultant charging of the pressure reservoir with pressurized air.

2. The system of claim 1 wherein the pressure reservoir comprises a storage canister attached to the bicycle frame.

3. The system of claim 1 wherein the pressure reservoir comprises a storage canister disposed within the bicycle frame.

4. The system of claim 3 wherein the bicycle frame includes an elongate, tubular down tube, and the storage canister is disposed within the hollow interior of the down tube.

5. The system of claim 1 wherein the pressure reservoir comprises a hollow interior chamber formed within and defined by the bicycle frame.

6. The system of claim 5 wherein the bicycle frame includes an elongate down tube, and the interior chamber is formed within and defined by the down tube.

7. The system of claim 1 wherein:
   the front fork attached to the bicycle frame is shock absorbing;
   the bicycle includes a front wheel having an axle which is rotatably connected to the front fork;
   the front fork includes a pair of legs which are attached to the axle; and
   one of the legs of the front fork functions as the pumping mechanism of the system, with the remaining leg functioning as a shock absorber for the front wheel.

8. The system of claim 7 wherein each of the legs comprises:
   a hollow cylinder;
   a piston disposed within the cylinder and slidably moveable therewithin; and an elongate piston rod attached to the piston and extending axially from the cylinder, the piston rod defining a distal end which is rotatably connected to the axle;

the cylinder of the leg which functions as the pumping mechanism being fluidly connected to the pressure reservoir.

9. The system of claim 8 wherein the cylinder is fluidly connected to the pressure reservoir via an air hose which extends externally along the bicycle frame.

10. The system of claim 1 further comprising a check valve fluidly coupled between the pumping mechanism and the pressure reservoir.

11. The system of claim 10 further comprising a pressure gauge fluidly coupled between the check valve and the pressure reservoir.

12. The system of claim 10 further comprising a pressure relief valve fluidly coupled between the check valve and the pressure reservoir.

13. The system of claim 1 wherein:

the bicycle includes front and rear air powered derailleurs; and the pressure reservoir is fluidly connected to each of the front and rear derailleurs.

14. The system of claim 13 wherein the pressure reservoir is fluidly connected to the front and rear derailleurs via respective ones of a pair of air hoses which extend externally along the bicycle frame.

15. A bicycle comprising:

a bicycle frame including a rear assembly;

a front fork attached to the bicycle frame;

at least one air powered derailleur attached to the bicycle frame;

an air pumping mechanism attached to at least one of the front fork and the rear assembly of the bicycle frame and adapted to provide a source of pressurized air when actuated; and a pressure reservoir fluidly connected to the pumping mechanism and to the derailleur;

the pumping mechanism being attached to the bicycle frame such that the passage of the bicycle over uneven terrain facilitates the actuation of the pumping mechanism and resultant charging of the pressure reservoir with pressurized air.

16. The bicycle of claim 15 wherein the pressure reservoir comprises a storage canister attached to the bicycle frame.

17. The bicycle of claim 15 wherein the pressure reservoir comprises a storage canister disposed within the bicycle frame.

18. The bicycle of claim 15 wherein the pressure reservoir comprises a hollow interior chamber formed within and defined by the bicycle frame.

19. A method of providing a supply of pressurized air to an air powered derailleur of a bicycle having a bicycle frame including a rear assembly, and a front fork attached to the bicycle frame, the method comprising the steps of:

(a) providing an air pumping mechanism which is attached to at least one of the front fork and the rear assembly of the bicycle frame and adapted to provide a source of pressurized air when actuated;

(b) providing a pressure reservoir which is fluidly connected to the pumping mechanism and to the derailleur; and (c) actuating the pumping mechanism to facilitate the charging of the pressure reservoir with pressurized air thereby.

20. The method of claim 19 wherein step (c) comprises riding the bicycle over uneven terrain.

21. In a bicycle having a bicycle frame and an air powered derailleur, the improvement comprising a self charging pressurized air system for the derailleur, the system comprising:

a shock absorbing front fork attached to the bicycle frame and having a first leg and a second leg;

a front wheel having an axle rotatably connected to the first and second legs of the front fork; and a pressure reservoir fluidly connected to the derailleur and the first leg of the front fork;

the first leg of the front fork being adapted to function as a pumping mechanism which provides a source of pressurized air when actuated and the second leg of said front fork being adapted to function as a shock absorber for the front wheel, the passage of the bicycle over uneven terrain facilitating the actuation of the first leg and resultant charging of the pressure reservoir with pressurized air.

22. A bicycle comprising:

a bicycle frame;

a shock absorbing front fork attached to the bicycle frame having a first leg and a second leg;

a front wheel having an axle rotatably connected to the first and second legs of the front fork;

at least one air powered derailleur attached to the bicycle frame; and a pressure reservoir fluidly connected to the first leg of the front fork and to the derailleur;

the first leg of the front fork being adapted to function as a pumping mechanism which provides a source of pressurized air when actuated, and the second leg of the front fork being adapted to function as a shock absorber for the front wheel, the passage of the bicycle over uneven terrain facilitates the actuation of the first leg and resultant charging of the pressure reservoir with pressurized air.

23. A method of providing a supply of pressurized air to an air powered derailleur of a bicycle having a bicycle frame, and a front wheel having an axle, the method comprising the steps of:

(a) providing a shock absorbing front fork which is attached to the bicycle frame and has the axle of the front wheel rotatably connected thereto, the front fork having a first leg adapted to function as a pumping mechanism for providing a source of pressurized air when actuated and a second leg adapted to function as a shock absorber for the front wheel;

(b) providing a pressure reservoir which is fluidly connected to the derailleur and the first leg of the front fork; and (c) actuating the first leg of the front fork to facilitate the charging of the pressure reservoir with pressurized air thereby.

* * * * *